United States Patent [19]

Busch et al.

[11] Patent Number: 4,746,690

[45] Date of Patent: May 24, 1988

[54] WATER-SOLUBLE POLYMER COMPOSITIONS

[75] Inventors: Peter Busch, Erkrath; Klaus Thiele, Langenfeld, both of Fed. Rep. of Germany

[73] Assignee: Henkel Kommanditgesellschaft auf Aktien, Duesseldorf, Fed. Rep. of Germany

[21] Appl. No.: 864,637

[22] Filed: May 16, 1986

[30] Foreign Application Priority Data

May 24, 1985 [DE] Fed. Rep. of Germany ....... 3518673

[51] Int. Cl.$^4$ ..................... A61K 7/06; A61K 31/74
[52] U.S. Cl. ............................ 524/27; 524/55; 527/312; 424/70; 424/489; 424/78
[58] Field of Search ............ 524/27, 55; 527/312; 536/30, 52; 424/70, 489, 78

[56] References Cited

U.S. PATENT DOCUMENTS

| | | | |
|---|---|---|---|
| Re. 28,474 | 7/1974 | Anderson et al. | 523/336 |
| 3,472,840 | 10/1969 | Stone et al. | 536/43 |
| 3,901,857 | 8/1975 | Sackman et al. | 162/168.3 |
| 4,240,450 | 12/1980 | Grollier et al. | 132/7 |
| 4,273,760 | 6/1981 | Koehler et al. | 424/70 |
| 4,292,212 | 9/1981 | Melby | 424/70 |
| 4,602,648 | 7/1986 | Syed et al. | 424/70 |
| 4,612,336 | 9/1986 | Yada et al. | 522/84 |

FOREIGN PATENT DOCUMENTS 1136842 12/1968 United Kingdom .

*Primary Examiner*—Delbert R. Phillips
*Assistant Examiner*—Nathan M. Nutter
*Attorney, Agent, or Firm*—Ernest G. Szoke; Henry E. Millson, Jr.

[57] ABSTRACT

Cationic polymer - containing compositions in dry, powder form and having enhanced water-solubility are obtained by mixing (1) from about 5% to about 99% by weight of a solid, finely divided water-soluble cationic polymer and (2) from about 1.0% to about 95% by weight of a solid, finely divided, water-soluble anionic surfactant. The compositions are useful in cosmetic preparations and as flocculating agents, sludge dewatering agents and paper auxiliaries.

12 Claims, No Drawings

WATER-SOLUBLE POLYMER COMPOSITIONS

BACKGROUND OF THE INVENTION

1. Field of the Invention

This invention relates to compositions containing a mixture of a water-soluble, cationic polymer and an anionic surfactant. The compositions are characterized by their enhanced water-solubility.

The compositions are used as flocculating agents, sludge dewatering agents, paper auxiliaries and as additives in various cosmetic preparations applied to the skin and hair.

2. Description of Related Art

U.S. Pat. No. 4,240,450 to Grollier, et al., assigned to L'Oreal, Paris, France, discloses compositions comprising a combination of a cationic polymer with an anionic polymer. The cationic polymers are generally present in an amount of 0.01% to 10%, and preferably 0.05% to 5%, of the total weight of the composition. The anionic polymers are generally present in an amount of 0.01% and 10%, and preferably 0.02% to 5%, of the total weight of the composition. The compositions are used in the treatment of keratin material, in particular human hair, skin and nails.

U.S. Pat. No. 3,901,857 to Sackman, et al., assigned to Bayer Aktiengesellschaft, Leverkusen, Germany discloses high molecular weight cationic copolymers of acrylamide or methyacrylamide and dialkylaminoalkylacrylate or dialkylaminoalkylmethacrylate and a process for producing same. The copolymers in the form of aqueous solutions are used as paper auxiliaries for cleaning and clarifying effluents, etc.

U.S. Pat. No. 3,472,840 discloses cationic polymers which are cellulose ethers in which the anhydroglucose units each contain from 1 to 3 substituents containing quaternary ammonium groups attached to the oxygen atoms of hydroxyl groups. The cellulose ethers thus disclosed are described as useful as flocculants, pigmemt retention aids in paper making, antistatic agents for fibers and fabrics, etc.

U.K. Pat. No. 1,136,842 to General Mills, Inc., Minneapolis, Minn. discloses cationic polygalactomannan derivatives and their use in the production of paper.

DESCRIPTION OF THE INVENTION

Water-soluble, cationic polymers have achieved considerable commerical recognition as flocculating agents, sludge dewatering agents and paper auxiliaries as well as additives for cosmetic products applied to the skin or hair. Unfortunately, however, many solid, finely divided cationic polymers are disadvantaged for such uses since, on addition to water, the polymer particles form into larger aggregates during hydration. As a result, the dissolution of the polymer occurs very slowly. At times, dissolution can be facilitated somewhat by the use of high efficiency mixing and stirring equipment. However, even using such equipment, effective dissolution is difficult and expensive to achieve.

It has now been found that compositions containing water-soluble cationic polymers can be rendered readily soluble in water, without the assistance of expensive stirring or mixing equipment, by mixing the cationic polymer with a solid, finely divided, water-soluble anionic surfactant. When such mixtures are added to water, and stirred gently, the mixture dissolves quickly in the water without the formation of the commonly encountered large gel clumps. The use of high-speed stirrers or high-shear mixing units is not only superfluous, it is actually advisable to carry out dissolution of the powder-form compositions of the invention in water without such units, i.e., with only gentle movement of the liquid.

The composition of the invention can also be dissolved in aqueous solutions already containing surfactants, for example, in cosmetic washing and cleaning preparations for the skin and the hair, such as shampoos, bathing preparations and liquid soaps, considerably more quickly than solid, finely divided, water-soluble cationic polymers alone. Another advantage is that the quantities of solid, finely divided, water-soluble anionic surfactants added from the compositions of the invention have no deleterious effects on the above cosmetic preparations.

In general, the water-solubility of any watersoluble cationic polymer can be enhanced by the process of this invention. Particularly well suited for use, however, are water-soluble cationic polymers, preferably having molecular weights in the range of 1,000 to 3,000,000, which either contain amino or alkyl substituted amino groups or quaternary ammonium groups in the polymer chain or carry secondary or tertiary amino groups or quaternary ammonium groups attached to the polymer chain either directly or indirectly through intermediate linkages. The amino groups and quaternary ammonium groups referred to herein may be 5- or 6-membered ring systems, for example, morpholine, piperidine, piperazine or imidazole rings. Water-soluble, cationic polymers of this type are disclosed in U.S. Pat. No. 4,240,450.

Many other water-soluble cationic polymers are useful in the practice of this invention. They include cellulose ethers, the anhydroglucose units of which each contain 1 to 3 substituents containing quaternary ammonium groups attached to the oxygen atoms of the hydroxyl groups. Compounds of this type are disclosed in U.S. Pat. No. 3,472,840.

Other cationic polymers which are suitable for use herein include: graft polymers of hydroxyethyl cellulose and dimethylalkylammonium chloride. One such polymer is available commercially under the trade name Celquat L-200 (National Starch and Chemical Corp., Bridgewater, N.J.). Also copolymers of acrylamide or methacrylamide and dialkylaminoalkylacrylate or diethylaminoalkylmethacrylate, for example, diethylaminoethylmethacrylate as described in U.S. Pat. No. 3,901,857 can be used as the water-soluble cationic polymer.

The present invention is particularly useful in the case of water-soluble cationic polymers which are in very finely divided solid form. Polymers of such natures include the cationic polygalactomannan derivatives disclosed in U.K. Pat. No. 1,136,842. Galactomannans are naturally occurring polysaccharides which are produced commercially however from locust bean gum, guar gum and tara gum. They are made up of a linear mannan main chain consisting of mannopyranose units which are attached by $\beta$-(1,4)-glycoside bonds and to which individual galactopyranose residues are fixed as branches by $\alpha$-(1,6)-glycoside bonds. The individual polygalactomannans differ from one another primarily in the mannose-galactose ratio. The cationic derivatives of the polygalactomannans are prepared by the reaction of hydroxyl groups of the polysaccharide with reactive quaternary ammonium compounds. Suitable reactive quaternary compounds are, for example, those having the formula:

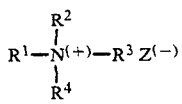

in which $R^1$, $R^2$ and $R^3$ represent a lower alkyl group, e.g. methyl, ethyl, etc; and in which $R^4$ is either an epoxyalkyl group having the formula

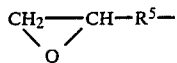

or a halohydrin group having the formula:

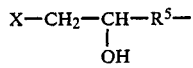

in which $R^5$ is a lower alkylene group, e.g. a $C_1$-$C_3$ alkylene group; X is a halogen atom, e.g. chlorine or bromine; and Z is an anion, such as for example, a chloride, bromide, iodide group or hydrogen sulfate.

In these cationic polymers, the degree of substitution should be at least 0.01 and, preferably, at least 0.05. In a typical compound, the degree of substitution is typically between 0.05 and 0.5.

A quaternary ammonium derivative of a polygalactomannan is a guar hydroxypropyl trimethylammonium chloride which contains a cationic group having the formula:

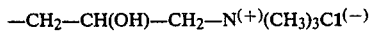

attached to the oxygen atoms of the hydroxyl group of the polysaccharide. Compounds of this nature are commercially available, for example under the trade names, Cosmedia Guar C261 (guar hydroxypropyl trimethylammoniumchloride degree of substitution (DS) is 0.07—Henkel Corporation); Jaguar C-13 (DS=0.11-0.13) and Jaguar C135 (DS=0.13).

As indicated heretofor, the objectives of this invention are achieved by mixing a cationic polymer, as herein described, with an anionic surfactant. As the solid, finely divided, water-soluble anionic surfactant component used in the practice of this invention one can employ an alkali metal, e.g. sodium, potassium, etc., or ammonium salt of a $C_8$-$C_{22}$ alkyl sulfate. Alkali metal salts of sulfuric acid semiester of linear or slightly branched fatty alcohols containing from about 10 to about 16 carbon atoms, e.g. ammonium lauryl sulfate or sodium lauryl sulfate, are particularly suitable for use.

However, other anionic surfactants, in powder form, can be used. These include alkali metal salts of linear and branched-chain alkylbenzene sulfonates containing from 6 to 16 carbon atoms in the alkyl groups; alkene and hydroxyalkane sulfonates of the type obtained by the sulfonation of α-olefins containing 10 to 18 carbon atoms; alkali metal salts of sulfosuccinic acid monoalkylesters containing from about 8 to about 18 carbon atoms in the alkyl groups; alkali metal salts of sulfosuccinic acid dialkylesters containing from about 6 to about 10 carbon atoms in the alkyl groups; mono- and dialkylnaphthalene sulfonate alkali metal salts containing from about 1 to about 8 carbon atoms in the alkyl group; alkylpolyglycol ether carboxylates containing from about 8 to about 18 carbon atoms in the alkyl group and having from about 2 to about 6 glycoether groups in the molecule; acyl sarcosines, acyl taurides and acyl isethionates containing from about 8 to about 18 carbon atoms in the acyl group; and alkali metal salts of α-sulfofatty methylesters of $C_8$-$C_{18}$ fatty acids.

Although the invention is particularly practiced using anionic surfactants which are in solid, finely divided form, in an alternate embodiment of the invention, one can employ anionic surfactants which, in pure form, cannot be produced as free-flowing powders. Surfactants of this nature, which are generally paste-like, low-melting or tacky in pure form, can be formulated into non-tacky, fine grained and free-flowing preparations using suitable adjuvants and carriers. The latter are preferably finely divided solid compounds which are readily soluble in water. Especially well suited for use as the adjuvants and carriers are inorganic water-soluble salts such as, for example, sodium sulfate, sodium chloride, sodium carbonate, sodium hydrogen carbonate, sodium phosphate and the corresponding potassium and ammonium salts. Additionally, one can use other water-soluble carriers, which are not salts, such as, urea; water-soluble mono-and disaccharides, etc.

In addition to the foregoing, the same adjuvants and carriers can be added to the cationic polymer -anionic surfactant preparations of this invention to improve the powder quality and/or flow properites thereof. Furthermore, small quantities of liquid or low-melting adjuvants can be added to the mixtures to reduce dust emission. Such adjuvants include, for example, ethylene glycol; propylene glycol; glycerol; polyethylene glycols; polypropylene glycols; ethylene glycol - propylene glycol block polymers; liquid or low melting alkyl (poly) glycolethers containing from 1 to about 22 carbon atoms in the alkyl groups and from 1 to about 20 glycoether groups. These adjuvants should not comprise greater than 5% by weight of the preparation of this invention to ensure that the freeflow powder properties of such preparations are not adversely affected.

In general, the cationic polymer compositions of this invention will be characterized by their powder form and enhanced water-solubility characteristics. The compositions will comprise (1) from about 5% to about 99% by weight, preferably from about 10% to about 95% by weight, more preferably from about 40% to about 90% by weight and most preferably from about 50% to about 90% by weight of a solid, finely divided, water-soluble cationic polymer (2) from about 1% to about 95% by weight, preferably from about 5% to about 90% by weight, more preferably from about 10% to about 60% by weight and most preferably from about 10% by weight to about 50% by weight of a solid, finely divided, water-soluble anionic surfactant and (3) from 0% to about 50% by weight of inert adjuvants and carriers. As noted heretofore, when a liquid or low melting adjuvant is added to the composition for reducing dust emissions, such material should not exceed 5% by weight of the composition. As a general rule, the adjuvants and carriers referred to herein are used only as needed to prevent tackiness and/or to reduce dust emission.

In the powder-form compositions of the invention the finely divided water-soluble cationic polymers preferably have a particle size such that at least about 69% by weight of the particles are no larger than 45 microns and at least 98% by weight of the particles are no larger than about 105 microns. The particle size of the anionic surfactant should not exceed a size which is five times larger than that of the cationic polymers.

The compositions of this invention are readily prepared by mixing the cationic polymer and the anionic surfactant at room temperature. Where the particle size, or the particle quality of one of the components differs from the size or quality of the other, it is preferable to reduce, by grinding, the coarser component to the size and/or quality of the finer component. In the most preferred embodiment of the invention, the components are first mixed and subsequently the mixture is made homogeneous by grinding. When carried out in this manner, the possibility is minimized that the components of the mixture will separate during transport, handling or storage. Where the water-soluble cationic polymer component is produced in powder form by the spray drying of an aqueous solution thereof, it is preferred to dissolve the anionic surfactant in the aqueous cationic polymer solution and spray drying the components of the solution together.

For a fuller understanding of the invention, reference can be made to the following examples which are intended as further illustration of the invention and are not to be construed in a limiting sense.

EXAMPLES

EXAMPLE 1

(a) In this example, 4.0 grams of guar hydroxapropyltrimethylammonium chloride and 2.0 grams of sodium dodecyl sulfate were added to, mixed together and lightly hand ground at room temperature in a mortar. A homogeneous, finely divided powder was obtained.

Dissolution Test: 0.5 grams of the powdery composition of this example was poured onto the surface of 100 ml of water, in a 250 ml glass beaker, at a temperature of 20° C. After about thirty seconds, the powder was gently stirred into solution. Additional 0.5 gram portions of the composition of this example were separately added to and dissolved in the solution until 3.0 grams total was used. It was observed that the preparations of the invention, when added to the water, dispersed immediately over the surface of the water and some relatively large clumps of powder spontaneously disintegrated. Upon gentle stirring, the composition of the invention was uniformly dispersed in the water and dissolved, without forming relatively large gel clumps, in a few seconds to form a homogeneous slightly cloudy solution.

(b) For comparative purposes, 3.0 grams of powdery pure guar hydroxyproplytrimethylammonium chloride was added in 0.5 gram portions, to 100 ml of water in a 250 ml glass beaker. The powder remained on the surface of the water and gel clumps, some with inclusions of powder, formed when stirring commenced. It was noted that, even after stirring for five minutes, the gel clumps still had not dissolved.

EXAMPLE 2

The procedure of Example 1 was repeated, except that 1.0 gram of Texapon L100 (Henkel Corporation trademark for a sodium alkyl ($C_{12}$–$C_{18}$)-sulfate) replaced the 2.0 grams of sodium dodecyl sulfate used in Example 1.

The powdery composition, thus obtained, was evaluated for its water-solubility by the Dissolution Test described in Example 1. It was found that the composition of this Example uniformly dispersed in water and with gentle stirring dissolved in a few seconds to form a homogeneous slightly cloudy solution.

EXAMPLE 3

The procedure of Example 1 was repeated once again, except that the 2.0 grams of sodium dodecyl sulfate employed in Example 1 was replaced by 2.0 grams of ammonium dodecyl sulfate.

The powdery composition, thus obtained, was evaluated for its solubility by the Dissolution Test described in Example 1. The composition of this Example uniformly dispersed in water with gentle stirring and dissolved in a few seconds to form a homogeneous slightly cloudy solution.

EXAMPLE 4

In this Example 3.0 grams of a water-soluble, cationic polymer (a graft polymer of the hydroxyethyl cellulose and dimethyldialkylammonium chloride - trade name "Celquat L-200" National Starch and Chemical Corp., Bridgewater, N.J.) and 2.0 grams of sodium dodecyl sulfate were added to and mixed together in a mortar at room temperature. They were gently ground into a homogeneous, finely divided powder.

The powdery composition, thus obtained, was evaluated for its solubility by the Dissolution Test described in Example 1. The composition of this Example uniformly dispersed in water with gentle stirring and dissolved in a few seconds to form a homogeneous slightly cloudy solution.

For comparative purposes, 3.0 grams of Celquat L-200 was added, in 0.5 gram portions, to 100 ml of water in a 250 ml glass beaker. The powder remained on the surface of the water and gel clumps, some coated with powder, when stirring commenced. The gel clumps had not dissolved even after five minutes stirring.

What is claimed is:

1. A polymer composition in powdered form which is readily soluble in water which comprises (1) from about 5% to about 99% by weight of at least one solid, finely divided, water-soluble cationic polymer and (2) from about 1% to about 95% by weight of at least one solid, finely divided, water-soluble anionic surfactant wherein the finely divided, water-soluble cationic polymer has a particle size such that at least about 69% by weight of the particles are no larger than 45 microns and at least about 98% by weight of the particles are no larger than about 105 microns, and the particle size of the finely divided, water-soluble amonic surfactant does not exceed a size which is five times larger than that of the cationic polymer.

2. The composition of claim 1 wherein there is present up to about 50% by weight of an inert carrier.

3. The composition of claim 1 wherein there is present from about 10% to about 95% by weight of component (1) and from about 5% to about 90% by weight of component (2).

4. The composition of claim 1 wherein there is present from about 40% to about 90% by weight of component (1) and from about 10% to about 60% by weight of component (2).

5. The composition of claim 1 wherein there is present from about 50% to about 90% by weight of component (1) and from about 10% to about 50% by weight of component (2).

6. The composition of claim 1 wherein the cationic polymer is a cationic polygalactomannan derivative.

7. The composition of claim 6 wherein the cationic polygalactomannan derivative is guar hydroxypropyltrimethylammonium chloride.

8. The composition of claim 1 wherein component (2) is an alkali metal or ammonium salt of a $C_8$–$C_{22}$ alkyl sulfate.

9. The composition of claim 8 wherein component (2) is sodium dodecyl sulfate.

10. The composition of claim 8 wherein component (2) is ammonium dodecyl sulfate.

11. A process for producing cationic polymer-containing compositions which are in powder form and readily soluble in water which comprises the steps of
   A. mixing (1) from about 5% to about 99% by weight of a solid, finely divided, water-soluble cationic polymer and (2) from about 1% to about 95% by weight of a solid, finely divided, water-soluble anionic surfactant, and
   B. grinding the resulting mixture to obtain a product at least 69% by weight of the particles of which are no larger than 45 microns and at least 98% by weight of which are no larger than 105 microns.

12. The polymer composition of claim 1 wherein the particle size of the amonic surfactant is approximately the same as that of the cationic polymer.

* * * * *